(12) United States Patent
Haller et al.

(10) Patent No.: US 10,865,874 B2
(45) Date of Patent: Dec. 15, 2020

(54) CONTROL ELEMENT, IN PARTICULAR FOR A MOTOR VEHICLE

(71) Applicant: Marquardt GmbH, Rietheim-Weilheim (DE)

(72) Inventors: Peter Haller, Balgheim (DE); Rainer Berchtold, Tuttlingen-Nendingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 106 days.

(21) Appl. No.: 15/392,146

(22) Filed: Dec. 28, 2016

(65) Prior Publication Data

US 2017/0146115 A1    May 25, 2017

Related U.S. Application Data

(63) Continuation of application No. PCT/EP2015/065809, filed on Jul. 10, 2015.

(30) Foreign Application Priority Data

Jul. 10, 2014  (DE) ................ 10 2014 010 191

(51) Int. Cl.
*F16H 59/02*    (2006.01)
*F16H 59/10*    (2006.01)
(Continued)

(52) U.S. Cl.
CPC ....... *F16H 59/0278* (2013.01); *F16H 59/044* (2013.01); *F16H 59/105* (2013.01);
(Continued)

(58) Field of Classification Search
CPC .................................................. F16H 59/0278
See application file for complete search history.

(56) References Cited

U.S. PATENT DOCUMENTS

D289,870 S  *  5/1987  Berchtold .................... D14/133
4,811,562 A  *  3/1989  Hoffmann ................ F15B 15/18
                                                    60/370
(Continued)

FOREIGN PATENT DOCUMENTS

DE      699 20 207 T2    1/2005
EP       1 077 337 A2    2/2001
(Continued)

OTHER PUBLICATIONS

German Search Report (Application No. 10 2014 010 191.6) dated Apr. 28, 2015.
(Continued)

*Primary Examiner* — Howard J Sanders
*Assistant Examiner* — Gregory T Prather
(74) *Attorney, Agent, or Firm* — Burr & Brown, PLLC

(57) ABSTRACT

The present invention relates to a control element, in particular, a switching device, for manually controlling and/or activating functions in a motor vehicle, comprising a lever. The lever is mounted on a support such that the lever can be adjusted in at least one direction from a neutral position to an adjustment position. The lever interacts with a pressure element which is guided in a gate track of a gate and is resiliently loaded, in particular, in such a way that a return force in the direction of the neutral position acts on the lever when it is adjusted. A cam is present in the gate. The cam, in the neutral position, acts upon the lever in order to reduce play such that the lever is biased in the direction towards the adjustment position.

13 Claims, 5 Drawing Sheets

Section through the horizontal tilting axis

(51) Int. Cl.
    *F16H 59/04*     (2006.01)
    *F16H 61/24*     (2006.01)
    *G05G 1/04*     (2006.01)
    *G05G 5/05*     (2006.01)
    *G05G 9/047*     (2006.01)

(52) U.S. Cl.
    CPC ............... *F16H 61/24* (2013.01); *G05G 1/04* (2013.01); *G05G 5/05* (2013.01); *G05G 9/047* (2013.01); *F16H 2059/0295* (2013.01); *F16H 2061/243* (2013.01); *G05G 2009/04755* (2013.01)

(56) References Cited

U.S. PATENT DOCUMENTS

| | | | | |
|---|---|---|---|---|
| 5,176,041 A * | 1/1993 | Meier | ....................... | G05G 5/03 338/128 |
| 5,339,705 A * | 8/1994 | Shirahama | .............. | F16H 59/10 74/473.27 |
| 5,410,931 A * | 5/1995 | Pecceu | .................. | F16H 59/044 74/335 |
| 5,450,054 A * | 9/1995 | Schmersal | ............ | F16H 59/044 338/128 |
| 5,680,797 A * | 10/1997 | Elsasser | ................... | G05G 5/06 74/471 R |
| 6,237,435 B1 | 5/2001 | Grönhage et al. | | |
| 6,448,670 B1 * | 9/2002 | Onodera | ................. | G05G 9/047 307/10.1 |
| 2002/0162699 A1 * | 11/2002 | Shiomi | ................. | F16H 59/105 180/315 |
| 2005/0028634 A1 * | 2/2005 | Giefer | .................. | F16H 59/044 74/473.33 |
| 2006/0075887 A1 * | 4/2006 | Shotwell | .................. | G10H 1/40 84/645 |
| 2006/0107782 A1 * | 5/2006 | Perry | ....................... | B60R 25/06 74/523 |
| 2008/0250891 A1 * | 10/2008 | Kanesa | .................... | F16H 61/24 74/473.36 |
| 2014/0033849 A1 * | 2/2014 | Yamamoto | .......... | F16H 59/0217 74/473.12 |
| 2014/0345410 A1 * | 11/2014 | Yamamoto | ............ | F16H 59/105 74/473.3 |
| 2014/0345412 A1 * | 11/2014 | Wang | .................... | F16H 59/105 74/473.21 |
| 2015/0068343 A1 * | 3/2015 | Tokumo | .............. | F16H 61/0213 74/473.12 |
| 2015/0267807 A1 * | 9/2015 | Tokumo | .................. | F16H 59/08 701/52 |
| 2016/0306380 A1 * | 10/2016 | Buschle | ................. | G05G 5/005 |
| 2018/0180173 A1 * | 6/2018 | Yamazaki | ............. | F16H 59/105 |
| 2018/0340607 A1 * | 11/2018 | Uenomachi | .............. | G05G 5/05 |

FOREIGN PATENT DOCUMENTS

| | | |
|---|---|---|
| EP | 1 980 771 A2 | 10/2008 |
| JP | 04-282061 | 10/1992 |
| JP | 09-269049 A1 | 10/1997 |
| JP | 2002-506402 | 2/2002 |
| JP | 2003-154868 | 5/2003 |

OTHER PUBLICATIONS

International Search Report and Written Opinion (Application No. PCT/EP2015/065809) dated Jan. 5, 2016.
English translation of International Preliminary Report on Patentability (Chapter I) (Application No. PCT/EP2015/065809) dated Jul. 10, 2015, 5 pages.
Chinese Office Action (Application No. 201580037476.5) dated Dec. 14, 2017 (with English translation).
Japanese Office Action (Application No. 2017-501198) dated Mar. 26, 2019 (with English translation).

* cited by examiner

Section in the Z plane

Gate with cam in detail

CONTROL ELEMENT, IN PARTICULAR FOR A MOTOR VEHICLE

CROSS REFERENCE TO RELATED APPLICATIONS

This application is a continuation of International Application No. PCT/EP2015/065809 filed Jul. 10, 2015, which designated the United States, and claims the benefit under 35 USC § 119(a)-(d) of German Application No. 10 2014 010 191.6 filed Jul. 10, 2014, the entireties of which are incorporated herein by reference.

FIELD OF THE INVENTION

The present invention relates to a control element, and specifically to a switching device, for manually controlling and/or activating functions in a motor vehicle that comprises a lever.

BACKGROUND OF THE INVENTION

Control elements, such as electrical and/or electronic selector devices constructed in the form of a joystick and or cursor selector, serve for manually activating and/or triggering functions in a motor vehicle. Amongst other things, such selector devices are utilized by a user to input data for an electrical apparatuses, for example in car radios, navigation apparatus, on-board computers or similar apparatuses in the motor vehicle. In particular, such a control element can also be utilized as an electronic gear selector for a transmission controlled by shift-by-wire in the motor vehicle.

Such a control element has a handle, which can be constructed for example in the form of a selector lever. The handle is movably mounted on a support in such a way that the handle may be adjusted manually in at least one direction from a neutral position. The handle may be optionally adjusted until it is in a adjustment position. A pressure element, which is guided in a gate path of a gate and is subjected to a resilient force, cooperates with the handle. In particular, a restoring force thereby acts on the handle in the direction of the neutral position when the handle is adjusted. It has been shown in such a control element that the handle has a certain play, in particular, in the neutral position.

SUMMARY OF THE INVENTION

The present invention is based on the object of developing the control element in such a way that the play of the handle, in particular, in the neutral position, is reduced. In particular, the handle should be actuable by the user in as play-free a manner as possible and its neutral position (zero position) should have the smallest amount of play possible.

In the control element according to the present invention, a cam is located in the gate. The cam acts on the handle in such a way that the handle is tensioned in the gate to reduce the movement play of the handle. Such a control element advantageously provides the user with particularly ergonomic operation. In particular, it is provided here that, to reduce the movement play, the cam acts on the handle in the neutral position in such a way that the handle is tensioned in the direction of the adjustment and/or towards the adjustment position For the purpose of further increasing the ergonomics for the operation of the control element by the user, the adjustment movement can be a pivoting movement of the handle. The handle can be shiftable in a first and/or a second pivoting direction about a first and/or a second pivot axis. The handle can preferably be a pivot-mounted selector lever. In a compact design, the support for the handle can be constructed as a universal joint, in particular, in the manner of a cardan joint.

A housing can be provided to protect the control element. The control element therefore forms a pre-assemblable structural unit. In a simple manner, the handle can comprise a gearshift shaft which is pivot-pivot in the support. Furthermore, the gearshift shaft can project out of the housing for manual operation of the handle by the user.

In a compact and functionally reliable design, the gearshift shaft can be movably mounted in the universal and/or cardan joint by means of a bearing pin. The universal and/or cardan joint can in turn be movably mounted in the housing by means of journals and/or bearing shells. The bearing points for the bearing pin and/or for the universal and/or cardan joint can be expediently embodied in a simple way in terms of justification as clearance fits. Owing to the cooperation between the cam and the gearshift shaft, the user is nevertheless provided with substantially play-free operation of the control element.

In a compact design, a guide duct for a resilient element for exerting the resilient force and for the pressure element can be located in the gearshift shaft. The resilient element can consist of a pressure spring. The pressure element can furthermore be a pin, a button, a journal or the like.

The cam can preferably be located on a gate wall of the gate, and more precisely in particular opposite the gate path. The gate can cost-effectively be composed of thermoplastic plastics material. For the purpose of simple manufacture, it can then be suitable for the cam to be injection molded on the gate wall during manufacture of the gate. It can furthermore be suitable for the cam path to have a 3D (three-dimensional) contour for generating a haptic for the adjustment of the handle, wherein such a gate of an inherently complex design may still be manufactured in a simple manner by injection molding.

In the case of the control element, a means can also be provided for recording the adjustment and/or the adjustment position. The means for recording the adjustment and/or the adjustment position can expediently comprise a code carrier which encodes the adjustment and/or the adjustment positions and a sensor which determines the encoding. In a compact form, all the adjustment positions here may be recorded by means of the single code carrier. The code carrier can cost-effectively be composed of a magnetic code plate, which, in particular, contains various mutually differentiable magnetic fields, and the sensor can be composed of a magnetic sensor, in particular, a plurality of Hall sensors at which a signal inversion occurs when the code plate is shifted. In a compact design, the code carrier can be mounted on the gearshift shaft by means of a guide component so that the code carrier may be moved by means of the handle in a way which corresponds to the adjustment of the handle. For the sake of simplicity, it can be suitable for the Hall sensors to be attached to a printed circuit board mounted in the housing.

For a particularly preferred design of the present invention, it is necessary to establish the following:

An input apparatus is to be created, with the aid of which it is possible to actuate a selector in a plurality of directions by means of a control lever in as play-free a manner as possible. The control lever should have as little play as possible in its normal position (zero position). By way of example, the input apparatus can be a gear selector.

In particular, the following points should be taken into account in terms of the construction:

cost-effective solution;

small number of components;

uncoupling of the individual mechanisms for actuating the control lever;

good wear-resistance of the hapticencoding elements; and small design size.

For this purpose, a gate form for the input apparatus is created, which gate form tensions the control lever or the gearshift shaft in the system. To fix the zero position of the control lever in the input apparatus, the following is provided here:

The selection movement of the control lever is initiated by means of the gearshift lever. The gearshift lever is seated on the gearshift shaft. The gearshift shaft is mounted in the universal joint by means of a bearing pin. The universal joint is in turn mounted in the housing lower-part by means of journals and bearing shells. This bearing serves for the decoupling of the the system to ensure shifting both horizontally and vertically. The individual bearing points are configured as clearance fits.

A guide duct for a pressure spring and a button is located in the gearshift shaft, wherein the button is pressed into the gate path of the gate by means of the pressure spring. The gate has a three-dimensional (3D) contour by way of which the haptic of the selector is generated.

The signal conversion takes place by means of a code plate mounted on the gearshift shaft by means of a guide component. This code plate contains various magnetic fields which, when the code plate is displaced, initiate signal inversion at various Hall sensors which are attached to a printed circuit board mounted in the housing lower-part.

Injection-molded on the gate wall is a cam which tensions the gearshift shaft slightly with respect to the cam and the other components. As a result of this tensioning, the remaining play in the individual bearing points is minimized and optimization of the zero-position play of the gearshift shaft of or the entire gearshift lever is thereby achieved. As a result, the gearshift shaft cannot be deflected under the action of a slight force (zero-position play).

An input apparatus is thereby created, which has a haptic gate with a cam for tensioning the system and an improved zero position.

The advantages achieved by the present invention include, in particular, the following.

As a result of the tensioning by means of the cam, the gearshift shaft is held very firmly and reliably in its zero position.

As a result of the cam being injection molded on a component which is required in any case, namely the gate, no additional component is necessary, which means that it is a cost-effective solution.

The control element has a compact construction, so that it is also suitable for a confined installation space in a motor vehicle.

Production tolerances of the components do not have any substantial influence on the zero-position play of the selector lever, which is in turn favorable in terms of the cost-effectiveness of the control element.

BRIEF DESCRIPTION OF THE DRAWINGS

An exemplary embodiment of the present invention with various developments and designs is illustrated in the drawings and will be described in more detail below.

FIG. 5 shows an enlarged detail view of FIG. 4, wherein

DETAILED DESCRIPTION OF THE INVENTION

Figure 1:
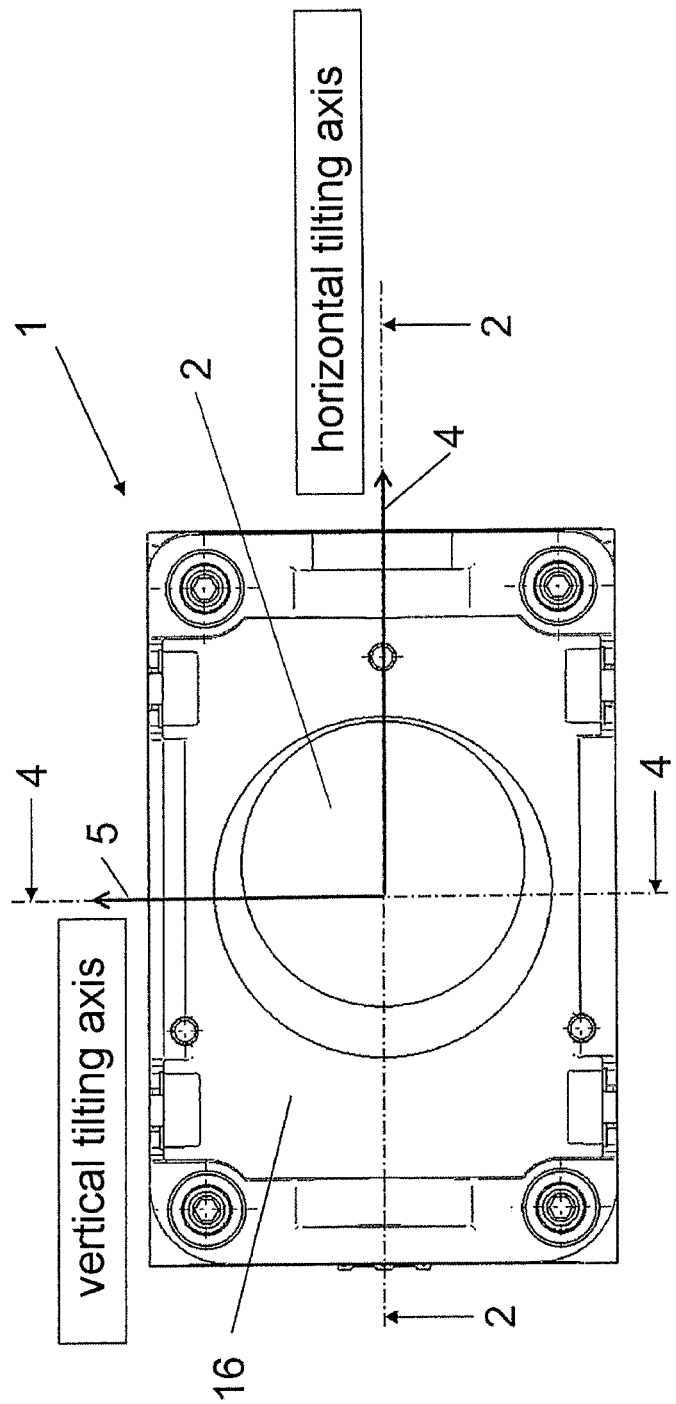
FIG. 1 shows a control element in a plan view.

FIG. 1. shows a control element 1 which serves for the manual activation of functions in a motor vehicle and is utilized, in particular, as a gear selector for a shift-by-wire selector device. The control element 1 is provided with a movable handle 2 in the manner of a selector lever. The handle 2 is movably mounted on a support 3 (see FIG. 2) in such a way that the handle 2 may be adjusted in at least one direction, preferably in two different directions 4, 5, from a neutral position. The handle 2 can be adjusted into associated adjustment positions so that the handle 2 may be adjusted manually into the adjustment positions by the user. When the user adjusts the handle 2 accordingly, the respective desired functions in the motor vehicle are thereby triggered and/or activated.

Figure 2:
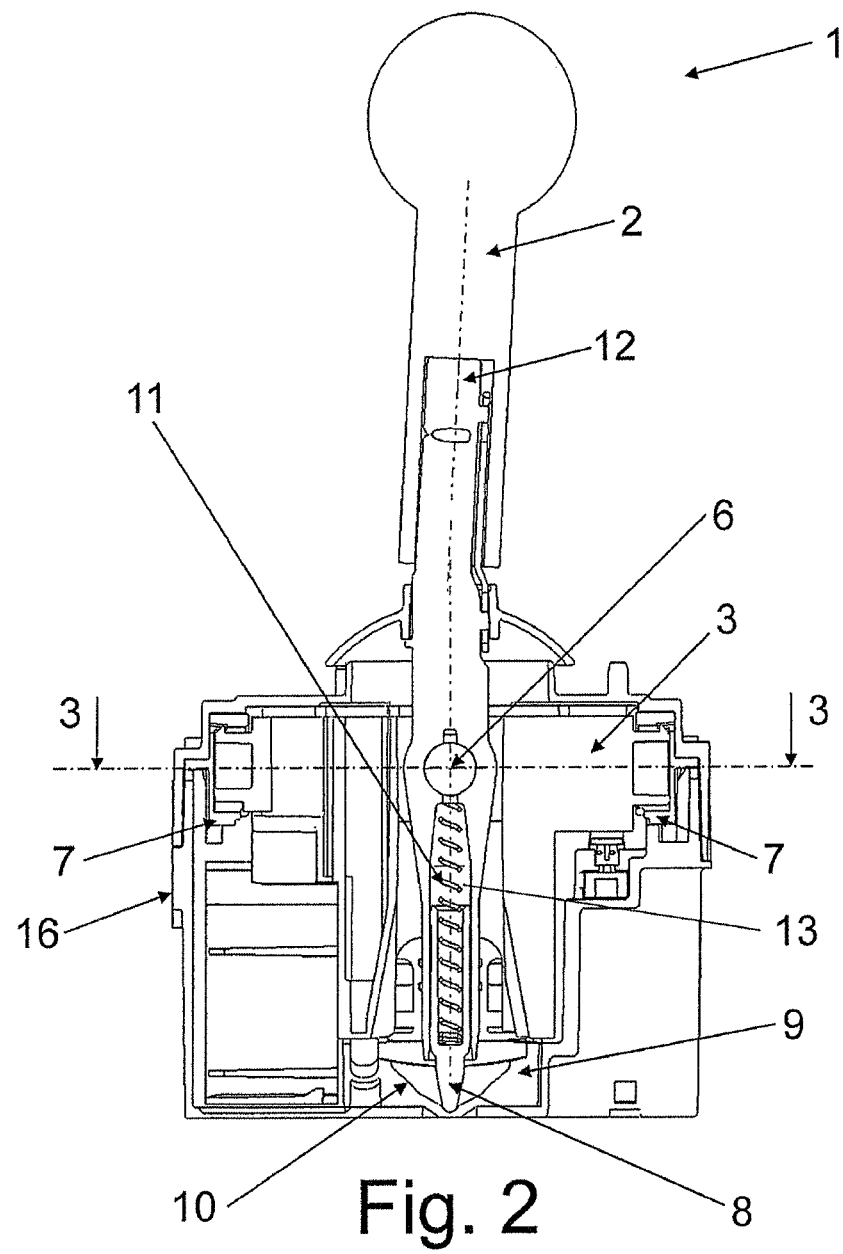
FIG. 2 shows a section along the line 2-2 in FIG. 1.
Figure 3:
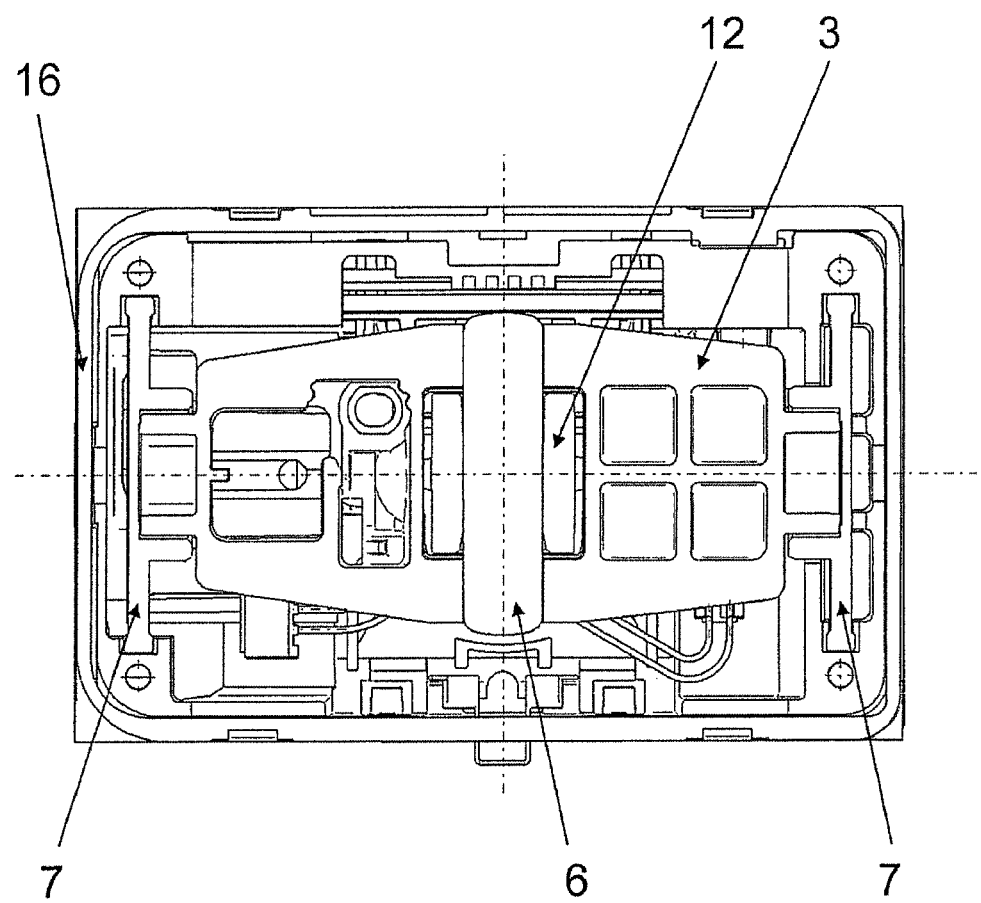
FIG. 3 shows a section along the line 3-3 in FIG. 2.

The handle 2 in this case is designed to be movable by pivoting, so that the handle 2 is a pivot-mounted lever. To this end, the handle 2, as can be seen in FIG. 2, may be adjusted by means of a bearing pin 6 about a first pivot axis in the first pivoting direction 4 and by means of a bearing 7 in the form of journals and/or bearing shells about a second pivot axis in the second pivot direction 5. The support 3 for the handle 2 is furthermore constructed as a cardan joint or a universal joint, as shown with reference to FIG. 3, in order to permit the pivoting movement in the respective pivoting direction 4, 5. In this case, the bearing points for the bearing pin 6 and/or for the bearing 7, i.e. the bearing points for the universal and/or cardan joint 3, are designed as clearance fits.

As is also revealed in FIG. 2, a pressure element 8 cooperates with the handle 2, wherein the pressure element 8 is guided in a gate path 10 of a gate 9. The pressure element 8 has a resilient element 11 and is consequently subjected to a resilient force. As a result of the guidance of the pressure element 8 in the gate path 10 when the handle 2 is pivoted, a restoring force thereby acts on the handle 2 in the direction of the neutral position when the handle is adjusted.

The handle 2 comprises a gearshift shaft 12 which is pivot-mounted in the support 3, as seen with reference to FIG. 2. A guide duct 13 for the resilient element 11 for exerting the resilient force and for the pressure element 8 is located in the gearshift shaft 12. The resilient element 11 here is composed of a pressure spring. The pressure element 8 is a pin, a button or a journal here. According to FIG. 1, the control element 1 also has a housing 16, wherein the gearshift shaft 12 projects out of the housing 16 for manual operation of the handle 2 by the user, as shown with reference to FIG. 2. The universal and/or cardan joint 3 is in turn movably mounted in the housing 16, and more precisely in the lower part of the housing 16, by means of the bearing 7.

Figure 5A:
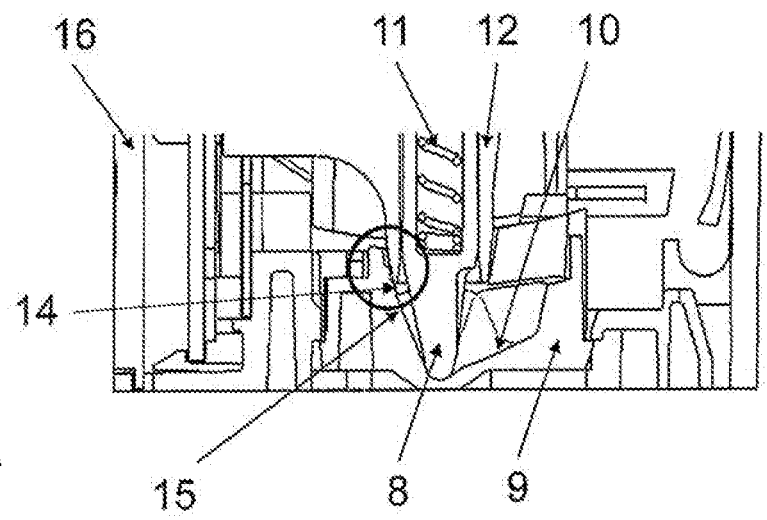
FIG. 5A is an enlarged view of the bottom portion of FIG. 4.
Figure 5B:
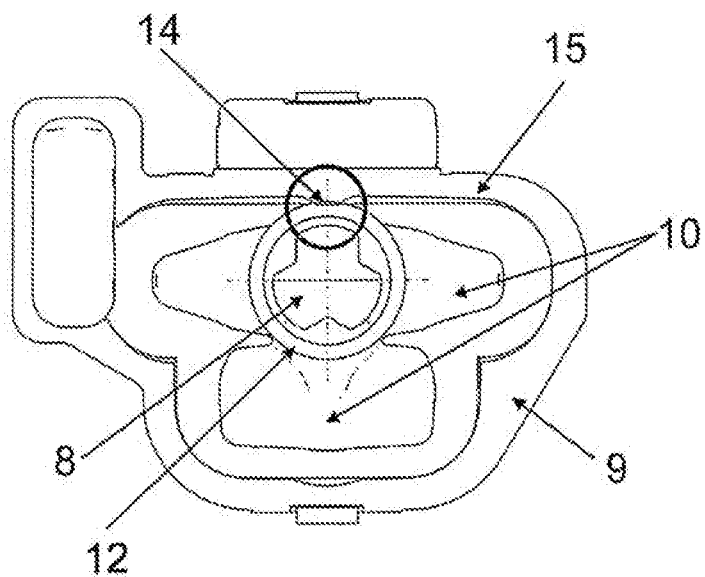
FIG. 5B is a top view of the enlarged portion of FIG. 5B taken through the un-labeled cut line shown in FIG. 4.

As seen in FIGS. 5A and 5B, a cam 14 is located in the gate 9. The cam 14 acts on the handle 2, and more precisely on the gearshift shaft 12, in such a way that the handle 2 is tensioned in the gate 9 to reduce the movement play of the handle 2. In particular, the cam 14 acts on the handle 2 or the gearshift shaft 12 in the neutral position in such a way that the handle 2 is tensioned in the direction of the shift and/or in the direction towards the adjustment position. As a result of this action, a reduction in the movement play of the handle 2 in the neutral position is achieved. The cam 14 is located on a gate wall 15 of the gate 9, wherein the gate wall 15 can be opposite the gate path 10. The cam 14 is expediently composed of thermoplastics plastics material and is manufactured by injection molding. The cam 14 is then injection molded on the gate wall 15 during manufacture of the gate 9. According to FIGS. 5A and 5B, the gate path 10 has a 3D (three-dimensional) contour to generate a haptic for the shifting of the handle 2.

Figure 4:
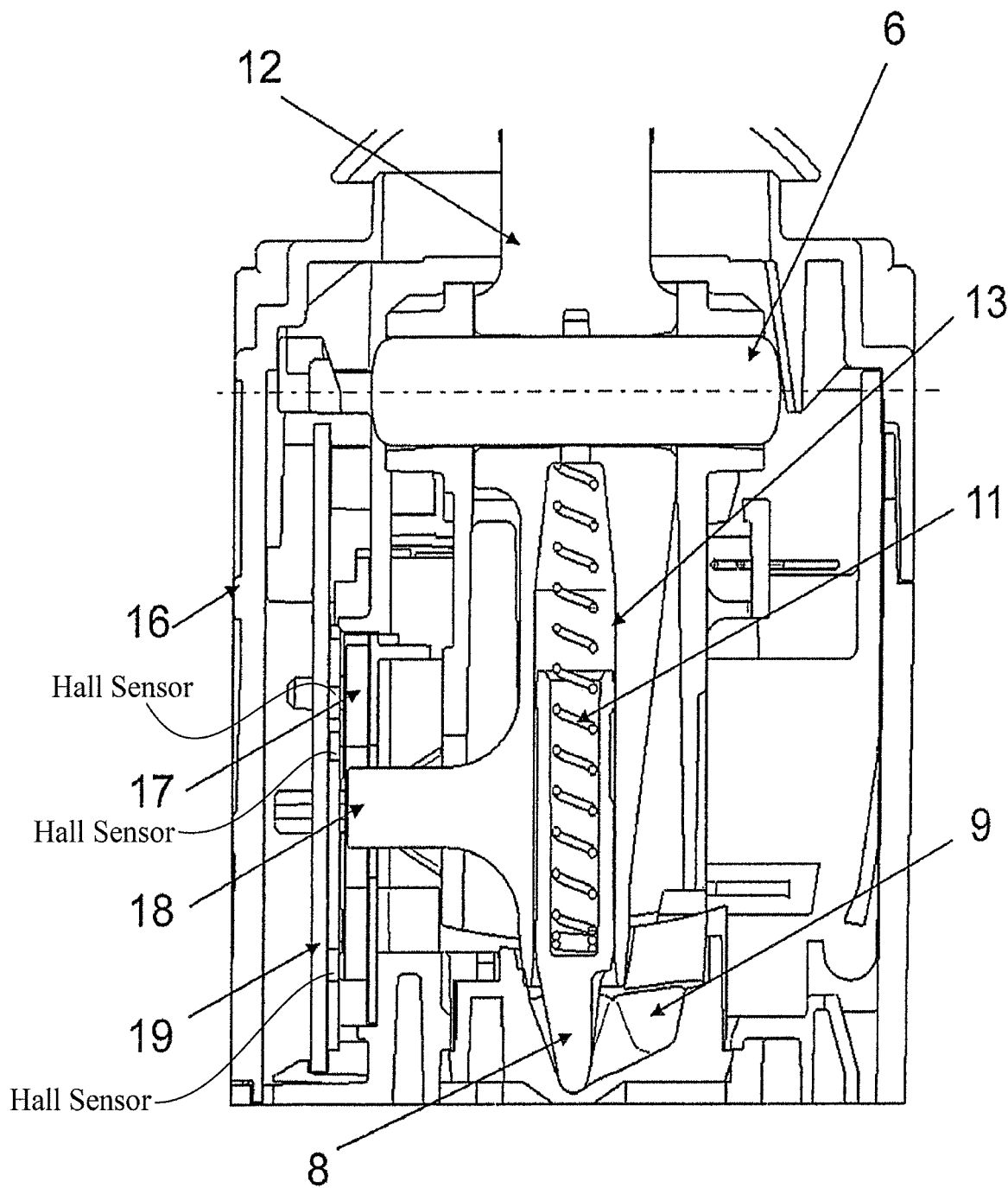
FIG. 4 shows a section along the line 4-4 in FIG. 1.

The control element 1 furthermore has a means for recording the adjustment and/or the adjustment position or the adjustment positions for the handle 2. The means for recording the adjustment and/or the adjustment positions comprises a code-carrier 17 (shown in FIG. 4), which may be displaced in a guided manner and encodes the adjustment and/or the adjustment positions, and a sensor determining the encoding. The code carrier 17 is composed of a magnetic code plate which contains various mutually differentiable magnetic fields for encoding the adjustment and/or the adjustment positions, for example, by means of corresponding magnetic tracks. The sensor is composed of a magnetic sensor, and more precisely, a plurality of Hall sensors here (see. e.g., FIG. 4), at which signal inversion occurs in a way corresponding to the displacement of the code plate 17. As a result, even when there are a plurality of adjustment positions, all the adjustment positions of the handle 2 may be recorded by means of the single code carrier 17 and a complex movement of the handle 2 may also be detected. The code carrier 17 is mounted on the gearshift shaft 12 by means of a guide component 18, whereby the code carrier 17 may be displaced in a way corresponding to the adjustment of the gearshift shaft 12. The Hall sensors are attached to a printed circuit board 19 mounted in the housing 16 as shown in FIG. 4.

A control element 1 of this type can be utilized for a gear selector in motor vehicles. In the case of such a shift-by-wire selector device for the transmission in the motor vehicle, the handle 2 is the selector lever for the shift-by-wire selector device and the shift-by-wire selector device generates corresponding signals for the positioning of the handle 2, wherein the signals serve to control the transmission. However, the present invention is not restricted to the exemplary embodiment described and illustrated. Instead it comprises all developments of which a person skilled in the art is capable within the scope of the invention defined by the patent claims. In addition to applications in motor vehicles, a control element 1 of this type can also be used in an advantageous manner as input means for computers, machine tools, household appliances or the like.

LIST OF REFERENCE NUMERALS

1: Control element
2: Handle
3: Support/universal and/or cardan joint
4, 5: Direction/pivoting direction
6: Bearing pin
7: Bearing
8: Pressure element
9: Gate
10: Gate path
11: Resilient element
12: Gearshift shaft
13: Guide duct
14: Cam
15: Gate wall
16: Housing
17: Code carrier/code plate
18: Guide component
19: Printed circuit board

The invention claimed is:

1. A control element for manually activating and/or triggering functions in a motor vehicle, comprising:
    a handle having a gearshift shaft pivot-mounted on a support so that the handle may be moved in at least one shift direction from a neutral position to one or more shift positions;
    a pressure element projecting from within the gearshift shaft, wherein the pressure element cooperates with the handle so that the pressure element is guided in a gate path of a gate, the gate consisting of a thermoplastic material, while being subjected to a resilient force from a resilient element positioned in the gearshift shaft, whereby a restoring force acts on the handle in a direction of the neutral position when the handle is moved; and
    a cam, consisting of a thermoplastic material, which is integral with respect to a portion of a gate wall of the gate that is opposite to the gate path, and which extends a distance away from an outer surface of the gate wall toward an outer surface of the gearshift shaft, wherein the cam engages the gearshift shaft in the neutral position so that the handle is tensioned in the gate in the at least one shift direction and/or toward the one or more shift positions to reduce a movement play of the handle.

2. The control element as claimed in claim 1, wherein the handle is movable in at least one of a first pivoting direction and a second pivoting direction about a respective one of a first swivel pivoting axis and a second swivel pivoting axis.

3. The control element as claimed in claim 2, wherein the handle is a pivot-mounted selector lever.

4. The control element as claimed in claim 3, wherein the support for the gearshift shaft is at least one of a universal joint and a cardan joint.

5. The control element as claimed in claim 4, further comprising a housing;
    wherein the gearshift shaft projects out of the housing for manual operation of the handle by a user.

6. The control element as claimed in claim 5, wherein the gearshift shaft is pivot-mounted in the at least one of the universal joint and the cardan joint by a bearing pin, wherein the at least one of the universal joint and the cardan joint is movably mounted in the housing by at least one of journals and bearing shells, and wherein bearing points for at least one of the bearing pin, the universal joint and the cardan joint fit with a clearance.

7. The control element as claimed in claim 5, further comprising a guide duct for the resilient element and the pressure element located in the gearshift shaft;

wherein the resilient element consists of a pressure spring; and wherein the pressure element is a pin or a button.

8. The control element as claimed in claim 5, further comprising:

a code carrier; and a sensor, wherein for each of the one or more shift positions of the handle, the code carrier is encoded such that when the handle is in that shift position, the sensor senses the encoding for that shift position such that the selected shift position of the handle is determined.

9. The control element as claimed in claim 8, wherein the code carrier comprises a magnetic code plate including a plurality of magnetic fields, and the sensor consists of a plurality of Hall sensors at which a signal inversion occurs when the code carrier is displaced.

10. The control element as claimed in claim 9, wherein the code carrier is mounted on the gearshift shaft by a guide component, and wherein the plurality of Hall sensors are attached to a printed circuit board mounted in the housing.

11. The control element as claimed in claim 1, wherein the gate path has a three-dimensional contour for generating a haptic for the shifting of the handle.

12. The control element as claimed in claim 1, wherein both the gate path and the pressure element are positioned below a bearing pin about which the gearshift shaft is pivot-mounted.

13. The control element claimed in claim 1, wherein the cam engages the gearshift shaft at a location that is spaced a vertical distance away from any position where the pressure element engages the gearshift shaft.

\* \* \* \* \*